3,271,196
FUEL CELL ELECTRODES
Harry G. Oswin, Chauncey, N.Y., assignor to Leesona Corporation, Cranston, R.I., a corporation of Massachusetts
No Drawing. Filed Nov. 8, 1961, Ser. No. 150,902
3 Claims. (Cl. 136—86)

This invention relates to improved fuel cell electrodes and more particularly to cathodes which exhibit greatly improved polarization characteristics. The novel electrodes are constructed from lithiated pure metals or alloys which have been irradiated.

A fuel cell as the term is employed in this specification, is an electrochemical cell in which the free energy of combustion of the reactants is converted directly into eelctrical energy. Such a cell, in its simplest form, comprises a housing, a cathode, an anode and an electrolyte between the electrodes. In operation, a fuel and oxidant are passed through or caused to come in contact with their respective electrodes.

In a cell employing aqueous acid or alkaline electrolytes, the reaction at the cathode, when air or oxygen is employed as the oxidant, results partially in the formation of peroxide ions. Oxygen molecules adsorbed on the cathode are ionized according to the mechanism:

$$2e^- + O_2 + H_2O \rightarrow OH^- + HO_2^- \qquad (I)$$

It has been observed that surfaces of lithiated host metals exhibit high efficiency for the above peroxide mechanism. However, in a fuel cell employing such structures, because the removal of $HO_2^-$ ions is not rapid enough, a limiting diffusion current, due to the build up of peroxide ions at the electrode, is observed. This peroxide ion concentration at the cathode increases polarization of the cathode and decreases the cell performance.

Accordingly, it is an object of the instant invention to provide a lithiated host metal electrode which will rapidly remove peroxide build-up in the fuel cell.

It is another object of this invention to provide irradiated electrodes having lithium introduced in a host metal which demonstrate excellent electrochemical performance characteristics.

It is another object of the invention to provide a fuel cell cathode which prevents or reduces peroxide accumulation in a fuel cell.

These and other objects of the invention will become more apparent from the following detailed description with particular emphasis being placed on the illustrative examples.

The objects of the instant invention are accomplished by constructing an electrode from lithiated host metals and thereafter irradiating the electrode or an electrode can be constructed from metals, at least one of which has been activated by irradiation, and thereafter incorporate lithium into the electrode structure. Employing the electrodes of the instant invention, the peroxide ions formed at the cathode, according to Equation I, are rapidly decomposed, promoted by the high energy radiation of the electrode, according to the mechanism:

$$2HO_2^- \rightarrow 2OH^- + O_2 \qquad (II)$$

Inasmuch as the concentration of peroxide ions is not permitted to build up, the electrochemical performance of the cell is substantially improved.

The lithiated materials which are employed as one element of the irradiated electrodes according to the instant invention are described in the Forten et al. co-pending application Serial No. 150,903 of even date entitled, "Improved Catalytic Systems." As set forth in the above-mentioned application, it is not completely clear how the lithium enters the host metal and is bound in it. It is established, however, that lithium actually diffuses into or penetrates the metal and becomes incorporated in such a manner that it is not removed upon immersion in water.

Metals which can be conveniently impregnated with elemental lithium for use in the electrodes of the instant invention include the pure elements and alloys of groups I-B and VIII of the Mendelyeev Periodic Table. More specifically, the metals include silver, gold, copper and their alloys from group I-B and iron, nickel, ruthenium, rhodium, platinum, osmium, iridium and palladium and their alloys from group VIII. While these metals are preferred, it is possible to employ still other metals as long as they will undergo lithiation and are sufficiently resistant to corrosion in the environment in which they are employed.

Lithium can be incorporated into the host metal by a number of methods. Thus, one method comprises immersing the metal into molten lithium and permitting lithium to diffuse or penetrate the metal. Subsequent to the lithium introduction step, further treatment of the system depends on the nature of the host material. In most cases, the system is removed from the lithium melt into a vacuum or inert atmosphere of helium or argon and heated to a temperature in the range of from about 250° C. to below the melting point of the host metal or alloy. The temperature at which the system is heated and duration of heating are factors which depend on the nature of the host material. Generally, the heating temperature is above 500° C. Thereafter, excess lithium is removed by immersion in water. Other methods of lithiating the host metal include vapor deposition, electroplating, and deposition from eutectic mixtures of lithium and calcium. These and other methods are more completely described in the before-mentioned Forten et al. co-pending application of even date entitled "Improved Catalytic Systems."

After the host metal is incorporated with lithium, it may be desirable to polish the surface of the metal before using it in electrode construction. Electrodes which have been polished in some fuel cell systems provide enhanced activity.

The amount of lithium which is incorporated in the host metal can be controlled by the method and conditions of introduction. However, for the instant electrode structures, it has been found that from about 10 to about 200 micrograms of lithium introduced into a square centimeter of the surface area will provide good electrochemical activity. However, the optimum range is from about 75–150 micrograms lithium introduced into a square centimeter of the surface area of the host metal.

The irradiated metals to be employed in the instant invention can be any metal capable of existing in a radioactive state, and which possesses the necessary properties of malleability, ductility and corrosion resistances for use in an electrode in a given electrolyte system. However, because of its convenience and its peculiar electrochemical performance characteristics silver 110 is preferred. Silver 110 emits β-radiation at 0.53 mev. and has a half-life of 270 days. Thus, an electrode employing silver 110 will be stable over a long period of time, giving the cathode a long, useful life. The isotope is produced by activation irradiation of natural silver. Therefore, silver can be irradiated and thereafter incorporated in an electrode or silver can be fabricated in an electrode and subsequently subjected to irradiation treatment. The radiation level can vary over a relatively wide range. However, for best electrochemical performance, the radiation level should be in the range equivalent to one microcurie to 10 millicuries per square centimeter of electrode surface.

The electrodes of the instant invention are preferably constructed by forming a porous sinter of the irradiated silver or silver alloy and thereafter lithiating the structure. Alternatively, a porous sinter can be made from silver or silver alloy and the sinter subjected to irradiation treatment followed by lithiation. As still another method, a metal sinter containing radioactive silver can be constructed and thereafter coated with an activating metal from groups I–B and VIII of the Periodic Table. The coating is then subjected to lithiation.

The metal sinters are prepared by any of the conventional techniques from powders having particle sizes of from about 1–100 microns in diameter. The sintering and compacting operations are performed employing a variety of temperatures and pressures. Thus, illustratively, a porous electrode can be prepared by placing a ring with a lip of the proper thickness, usually from about 0.003 inch to about 0.30 inch, over an alumina coated disc, pressing the powder of the selected particle size on the disc and striking off excess powder to form a layer of approximately the thickness of the lip. The powders are then compacted as for example by vibratory techniques and sintered. In the compaction operation, the pressure at which the powders are pressed can vary over a relatively wide range. Thus, compaction can be carried out at pressures as low as about 500 p.s.i. and as high as 8,000 p.s.i. The sintering of the electrode after compaction can be performed in any of the usual sintering furnaces, as for example, a retort inclined furnace. The sintering temperatures, depending upon the metals employed, can vary from about 600–2500° F. The sintering operation, often can be performed with advantage in an inert atmosphere of hydrogen or forming gas, or again, it may be preferable to carry out the sintering step in air, argon or a vacuum.

The electrodes of the instant invention are usually homo-porous structures with pore sizes ranging from about 0.1 to 100 microns. However, it is possible to construct the electrodes as a bi-porous structure or to use a substantially non-porous rod or plate and cause the oxidant to flow around the electrode. The latter electrodes are particularly satisfactory when the oxidant is incorporated directly into the electrolyte.

Having described the instant invention in general terms, the following examples are being set forth to more particularly illustrate the invention.

*Example 1*

A ring with a 0.20 inch lip is pressed over an alumina coated disc and 1% silver and 99% palladium alloy powders having particle sizes of from about 5–8 microns in diameter are placed on the disc. The disc is laterally vibrated on a vibrator at an amplitude of 0.006 inch for three minutes and the disc sintered in an inclined retort furnace at a temperature of 1830° C. for 45 minutes in an atmosphere of hydrogen. The resultant structure is substantially homo-porous.

A homo-porous disc 20 mils thick, prepared as in the example above, was enclosed in an aluminum capsule and irradiated with neutrons from a uranium source for 10 days. At the end of the irradiation, the structure contained 150 microcuries per square centimeter of electrode surface.

The activated structure was immersed in a molten 30% lithium-70% calcium alloy eutectic mixture (temperatures being from about 230–260° C.) for a period of 5 to 15 seconds. The lithiated host metal system was removed from the mixture and heated to a temperature of 700° C. for two minutes before immersing the system in water to remove excess lithium. The lithiation is substantially uniform throughout the metal surface. The lithiation operation was carried out under an atmosphere of argon substantially free of oxygen and nitrogen.

The half cell reaction of the electrode in five normal aqueous potassium hydroxide at 60° C. and 8 p.s.i. employing air as the oxidant at 100 ma./cm.$^2$ gave 350 millivolts polarization from theoretical reversible potential.

*Example 2*

Platinum alloy powders having sizes of from about 25–30 microns in diameter and containing 3% silver are sifted into a ring having a 0.5 inch lip and pressed at a pressure of 3,000 p.s.i. for eight minutes. Thereafter, the structure is sintered at a temperature of 2,000° F. for a period of 40 minutes. The resultant structure is a substantially homo-porous disc.

A homo-porous disc 20 mils thick, prepared as in the example above was enclosed in an aluminum capsule and irradiated with neutrons from a uranium source for 10 days. The irradiated structure contains 150 microcuries per square centimeter of electrode surface.

The structure was placed in a suitable vapor deposition apparatus. The apparatus is evacuated and a molybdenum boat containing lithium is electrically heated until the lithium is melted and its surface is shiny indicating relative surface purity. The irradiated silver-platinum sintered alloy is swiveled directly over and one inch above the molten lithium. Lithium vapors are permitted to deposit on the alloy for a period of one fourth minute. The sinter is reversed in order to deposit lithium on the second surface. Upon completion of the deposition, the sample is swiveled between tungsten heating elements spaced an equal distance from each, where the total distance between the elements is between one half and three fourths inch. The sample is heated to 800° C. for one minute. Upon immersion of the sample in water, no reaction between lithium and water is observed. A flame test on a portion of the sample demonstrated the presence of lithium in the sinter.

The half cell reaction of the electrode in two normal sulphuric acid at 40° C. and 8 p.s.i. with air as the oxidant at 100 ma./cm.$^2$ gave 500 millivolts polarization from theoretical reversible potential.

In Examples 1 and 2, the metal which is selected for alloying with silver, or which is sintered with silver can be replaced by other metals including gold, silver, copper, iron, nickel, ruthenium, rhodium, platinum, osmium, iridium and palladium and their alloys. The lithium in the above examples can be replaced by other metals including calcium, magnesium, rubidium and cesium.

The instant electrodes are particularly well suited for use in low temperature cells, thus, the electrodes can be employed in cells operating at temperatures of from about 20° C. to provide satisfactory current densities. However, since the electrodes are highly stable to heat and corrosion, they can be employed in medium and high temperature cells as well. Therefore, fuel cell systems employing the instant electrodes can be operated in the temperature range of from about 20–600° C. with satisfactory performance.

Fuels known in the art can be used in fuel cell systems employing the electrodes of the instant invention. Thus, hydrazine, ammonia, formaldehyde, hydrogen and the carbonaceous fuels are operable. The proper choice of fuel depends primarily upon its commercial availability and upon the operating temperature of the cell. The proper selection is within the ability of one skilled in the art. While the instant electrodes are primarily useful as cathodes, they demonstrate good electrical performance characteristics when employed at the fuel side or anode of a fuel cell system.

While various modifications of this invention are described, it should be appreciated that the instant invention is not restricted thereto, but that other embodiments of the invention will become apparent to one skilled in the art which come within the scope and spirit of the invention and the appended claims.

What is claimed is:

1. A fuel cell for the generation of electrical energy directly from a fuel and oxidant comprising an electrolyte, an oxidizing electrode, a fuel electrode, said electrodes being in contact with said electrolyte, and means for providing fuel cell reactants to said electrodes, at least one of said electrodes comprising a structure having elemental lithium uniformly dispersed at least at the surface of a radioactive host metal, said host metal being a member of the group consisting of Group I–B and Group VIII metals of the Mendelyeev's Periodic Table and said lithium being present in an amount of from 10–200 micrograms per square centimeter of surface area of said host metal, the radiation level of the radioactive host metal being in the range of from 1 microcurie to 10 millicuries per square centimeter of electrode surface.

2. The fuel cell of claim 1, wherein the lithium is present in an amount of from 75–150 micrograms per square centimeter of surface area of said radioactive host metal.

3. The fuel cell of claim 1, wherein the radioactive host metal contains silver 110.

References Cited by the Examiner
UNITED STATES PATENTS

| | | | |
|---|---|---|---|
| 2,716,670 | 8/1955 | Bacon | 136—120 |
| 2,914,596 | 11/1959 | Gorin et al. | 136—86 |
| 3,042,551 | 7/1962 | Perry et al. | 136—86 |
| 3,057,791 | 10/1962 | Anderson | 204—154 |
| 3,058,896 | 10/1962 | Nahin | 204—154 |
| 3,067,115 | 12/1962 | Clingman | 204—154 |
| 3,085,952 | 4/1963 | Odioso et al. | 204—154 |

FOREIGN PATENTS 220,422    8/1924    Great Britain.

OTHER REFERENCES

Gilbert, Abstract of Application Serial No. 748,353, published May 16, 1950, O.G. 634, page 985.

WINSTON A. DOUGLAS, *Primary Examiner.*

JOHN H. MACK, *Examiner.*

D. L. WALTON, *Assistant Examiner.*